United States Patent
Dean et al.

(10) Patent No.: US 10,520,657 B2
(45) Date of Patent: Dec. 31, 2019

(54) RADAR SYSTEMS AND METHODS FOR DETECTING OBJECTS

(71) Applicants: Michael Dean, St. Paul, MN (US); Haozhe Dong, Plymouth, MN (US)

(72) Inventors: Michael Dean, St. Paul, MN (US); Haozhe Dong, Plymouth, MN (US)

(73) Assignee: CCTEG (China Coal Technology and Engineering Group Corp), Beijing (CN)

( * ) Notice: Subject to any disclaimer, the term of this patent is extended or adjusted under 35 U.S.C. 154(b) by 336 days.

(21) Appl. No.: 15/436,081

(22) Filed: Feb. 17, 2017

(65) Prior Publication Data

US 2018/0239011 A1    Aug. 23, 2018

(51) Int. Cl.

| | |
|---|---|
| *F21V 23/04* | (2006.01) |
| *F21V 8/00* | (2006.01) |
| *H01Q 15/08* | (2006.01) |
| *G01S 7/03* | (2006.01) |
| *G01S 13/56* | (2006.01) |
| *H01Q 19/06* | (2006.01) |
| *H01Q 5/22* | (2015.01) |
| *G01S 7/02* | (2006.01) |

(52) U.S. Cl.
CPC ............. *G02B 6/0005* (2013.01); *G01S 7/03* (2013.01); *G01S 13/56* (2013.01); *H01Q 5/22* (2015.01); *H01Q 15/08* (2013.01); *H01Q 19/062* (2013.01); *G01S 2007/027* (2013.01)

(58) Field of Classification Search
CPC ...... G01S 13/56; G01S 2007/027; G01S 7/03; G02B 6/0005; H01Q 15/08; H01Q 19/062; H01Q 5/22
USPC .......................................................... 342/52
See application file for complete search history.

(56) References Cited

U.S. PATENT DOCUMENTS

2006/0202909 A1*   9/2006 Nagai .................... H01Q 15/08
                                                        343/911 R

OTHER PUBLICATIONS

Banner Engineering—downloaded on May 22, 2017 from http://global.bannerengineering.com/en-EU/products/sub/217.
ISys—downloaded on May 22, 2017 from http://www.innosent.de/isys-systeme/isys-4004/.
Symeo—downloaded on May 22, 2017 from https://www.symeo.com/en/products/positioning-sensors/index.html.

* cited by examiner

*Primary Examiner* — Timothy A Brainard

(57) ABSTRACT

A radar system for detecting objects can comprise an RF transmitter that emits RF light and at least one light source that emits visible light in response to the RF light detecting the presence of an object. The system can include a dielectric lens that collects and focuses the RF light. The dielectric lens can also include features that collect and scatter the visible light.

20 Claims, 8 Drawing Sheets

RADAR SYSTEMS AND METHODS FOR DETECTING OBJECTS

BACKGROUND

Field

The invention is directed to radar systems, and more specifically, to radar systems and methods for detecting objects.

Description of Related Art

Radar is an object-detection system that uses radio waves to determine the range, angle, or velocity of objects. Radar can be used in a variety of industries and can employ radio waves set at specific radio frequencies (RF) to detect many different objects, such as aircraft, ships, spacecraft, motor vehicles, and even weather formations.

In the mining industry, radar can be used to detect the presence of objects, such as mining carts, tractors, people, and the like. Prior art mining radar often includes complicated systems comprising separate detection indication systems and RF transmitters. Aside from being expensive, these systems offer poor reliability because each separate device has multiple sealing points, which can be easily compromised by dust and moisture from the mines. Moreover, because mines are small confined spaces, the prior art systems are burdensome because they take up extra unnecessary space. Thus, there is a need for radar systems and methods that reduce cost, increase reliability, and take up less space.

SUMMARY

The present disclosure includes a radar system for detecting objects. The radar system can include a housing and an RF transmitter coupled to the housing. The RF transmitter can emit RF light along a first direction and a second direction that is not parallel to the first direction. The radar system can also include at least one light source coupled to the housing. The at least one light source can emit visible light along the first direction and the second direction. The radar system can even include a dielectric lens coupled to the housing. The dielectric lens can collect RF light and focus the RF light. As well, the dielectric lens can collect visible light and scatter the visible light.

In some embodiments, the dielectric lens collects RF light traveling along the first direction and the second direction, and the dielectric lens focuses the RF light along the first direction. As well, in several embodiments, the dielectric lens collects visible light traveling along the first direction and the second direction, and the dielectric lens scatters the visible light along the first direction and the second direction. The second direction can be within 5 degrees of parallel from the first direction.

The radar system can emit the visible light in response to the RF light detecting the presence of an object. As well, the radar system may not emit the visible light in response to the RF light detecting the absence of the object.

Even still, in some embodiments, the dielectric lens collects the RF light and the visible light along a first side of the dielectric lens, and the dielectric lens focuses the RF light and scatters the visible light from a second side that is opposite the first side. The first side can be substantially flat. The second side can define a dome shape. In some embodiments, the first side and the second side define a cylindrical shape.

The first side of the dielectric lens can comprise at least one visible light diffusing-feature arranged and configured to collect the visible light traveling along the first direction and the second direction, and scatter the visible light, from the second side, along the first direction and the second direction. Additionally, in some embodiments, the second side of the dielectric lens comprises a plurality of RF light aiming features arranged and configured to collect the RF light traveling along the first direction and the second direction, and focus the RF light, from the second side, along the first direction.

Furthermore, in some embodiments, the at least one light source is disposed closer to the dielectric lens than the RF transmitter. As well, in some embodiments, the at least one light source is disposed at least one of equidistant and further from the dielectric lens than the RF transmitter.

Even still, in some embodiments, the at least one light source comprises a first light source disposed along a top side of the housing and a second light source disposed along a bottom side of the housing. It should be appreciated that the bottom side is opposite the top side. In such embodiments, the radar system can further include a first light pipe disposed along the top side of the housing, wherein the first light pipe defines an exterior surface arranged and configured to reflect at least a portion of the RF light and an interior surface arranged and configured to diffuse the visible light. The radar system can also include a second light pipe disposed along the bottom side of the housing, wherein the second light pipe defines an exterior surface arranged and configured to reflect at least a portion of the RF light and an interior surface arranged and configured to diffuse the visible light.

The first light pipe can define a first cone-shape having a first base and a first tip disposed opposite the first base, and the second light pipe can define a second cone-shape having a second base and a second tip disposed opposite the second base. In some embodiments, the first base and the second base are disposed closer to the RF transmitter, the first light source, and the second light source than the first tip and the second tip. As well, in some embodiments, the first tip and the second tip are disposed closer to the dielectric lens than the first base and the second base.

The disclosure also includes a dome-shaped lens having a first side and a second side opposite the first side. The first side can be substantially flat and the second side can define a dome-shape. The dome-shaped lens can include at least one visible light diffusing-feature arranged and configured to collect visible light traveling towards the first side, and scatter the visible light from the second side. As well, the dome-shaped lens can include a plurality of RF light aiming features arranged and configured to collect RF light traveling towards the first side, and focus the RF light from the second side.

The at least one visible light diffusing-feature can be disposed along the first side of the dielectric lens. The plurality of RF light aiming features can be disposed along the second side of the dielectric lens.

In some embodiments, the at least one visible light diffusing-feature is arranged and configured to collect visible light traveling along a first direction and a second direction that is not parallel to the first direction, and scatter the visible light, from the second side. Furthermore, in some embodiments, the plurality of RF light aiming features are arranged and configured to collect the RF light traveling along the first direction and the second direction, and focus the RF light, from the second side, along the first direction.

The first side of the dome-shaped lens can be arranged and configured to redirect the RF light. The at least one visible light diffusing-feature can define a plurality of triangles disposed adjacent one another.

In some embodiments, the dielectric lens further includes a first light pipe extending from a top side of the dome-shaped lens, wherein the first light pipe defines an exterior surface arranged and configured to reflect the RF light and an interior surface arranged and configured to diffuse visible light. As well, in some embodiments, the dielectric lens further includes a second light pipe extending from a bottom side of the dome-shaped lens, the bottom side being opposite the top side, wherein the second light pipe defines an exterior surface arranged and configured to reflect the RF light and an interior surface arranged and configured to diffuse visible light.

The embodiments described above include many optional features and aspects. Features and aspects of the embodiments can be combined.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments. The above and other features of the present invention will become more apparent by describing in detail exemplary embodiments thereof with reference to the accompanying drawings, in which.

DETAILED DESCRIPTION

Figure 1:
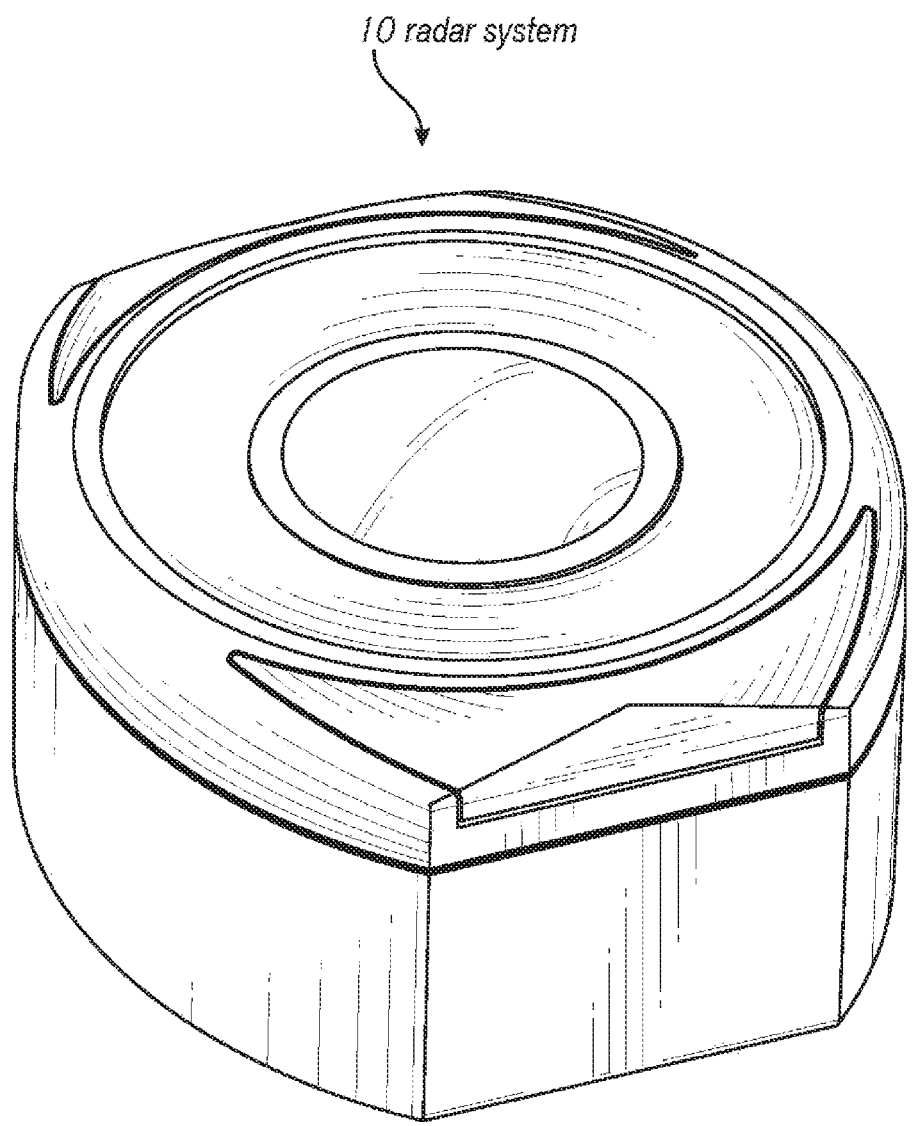
FIG. 1 illustrates a perspective view of a radar system, according to embodiments of the present disclosure.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

LIST OF REFERENCE NUMERALS

10—Radar system
12—Housing
14—RF transmitter
16—RF light
18—Light source
20—Visible light
22—Dielectric lens
24—Object
30—First side
32—Second side
34—Substantially flat
36—Dome shape
40—Visible light diffusing-feature
41—RF light aiming feature
42—Circuit board (or housing)
44—Light pipe
46—Top side
48—Bottom side
50—Cone shape
52—Base
54—Tip
56—Exterior surface
58—Interior surface
60—Plurality of triangles

INTRODUCTION

The radar system 10 (system 10), as disclosed, can address the disadvantages as previously described. For example, embodiments of the radar system 10 for detecting objects can integrate the RF transmitter 14 and the indication system (e.g. light source 18) into one device. Accordingly, the radar system 10 can reduce cost, take up less space, and reduce the number of sealing points to thereby increase reliability.

Radar System Embodiments

As shown in FIG. 1, the present disclosure includes a radar system 10 for detecting objects. According to FIG. 2, the radar system 10 can include a housing 12. The housing 12 can be constructed of any material suitable for mining conditions, such as die cast aluminum, plastic, and the like. In some embodiments, the housing 12 is a circuit board like the one shown in FIG. 8.

Figure 2:
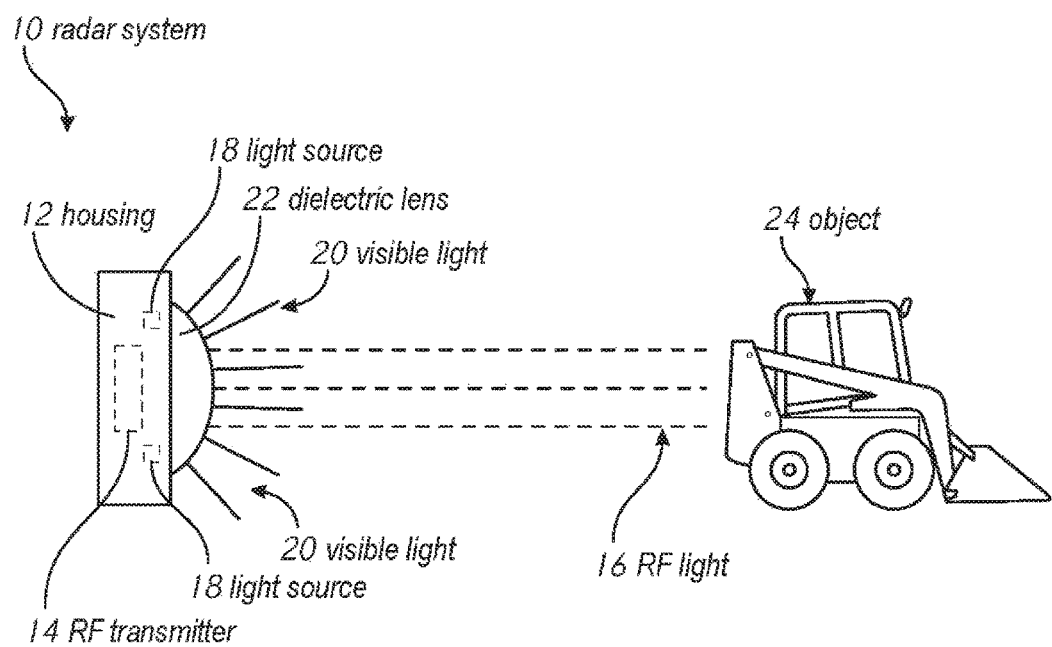
FIG. 2 illustrates a side view of a radar system detecting an object, according to embodiments of the present disclosure.
Figure 3:
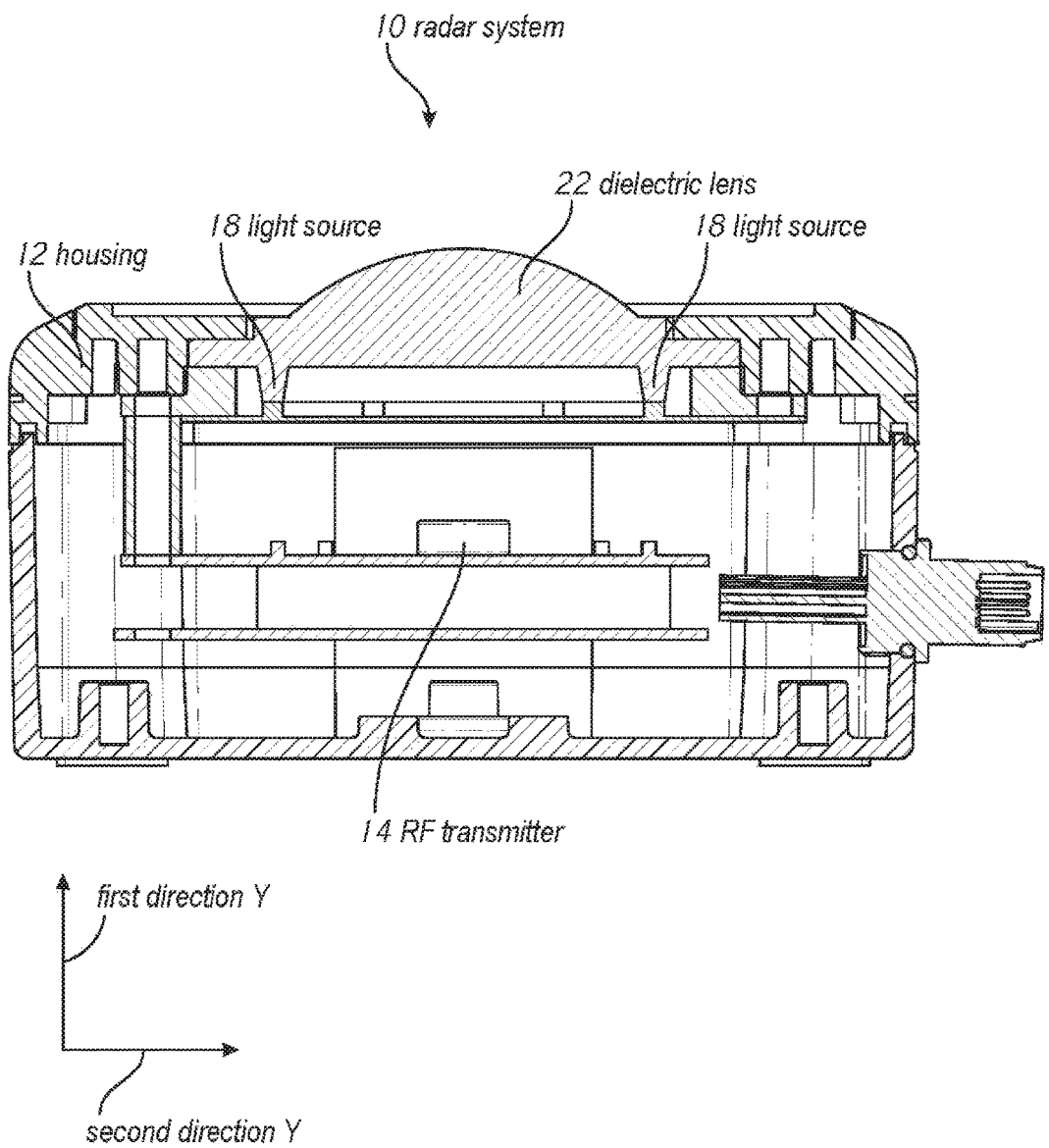
FIG. 3 illustrates a cross-sectional view of a radar system, according to embodiments of the present disclosure.

With reference to FIGS. 2 and 3, the radar system 10 can also include an RF transmitter 14 coupled to the housing 12. The RF transmitter 14 can emit RF light 16 along a first direction X and a second direction Y that is not parallel to the first direction X. Additionally, the RF transmitter 14 can be a standalone RF emitter, a standalone RF receiver, or both a combination RF emitter and receiver. In this regard, the RF emitter and receiver can be in the same package, thus called transmitter, or the RF emitter and receiver can be separate and distinct from each other.

Figure 4:
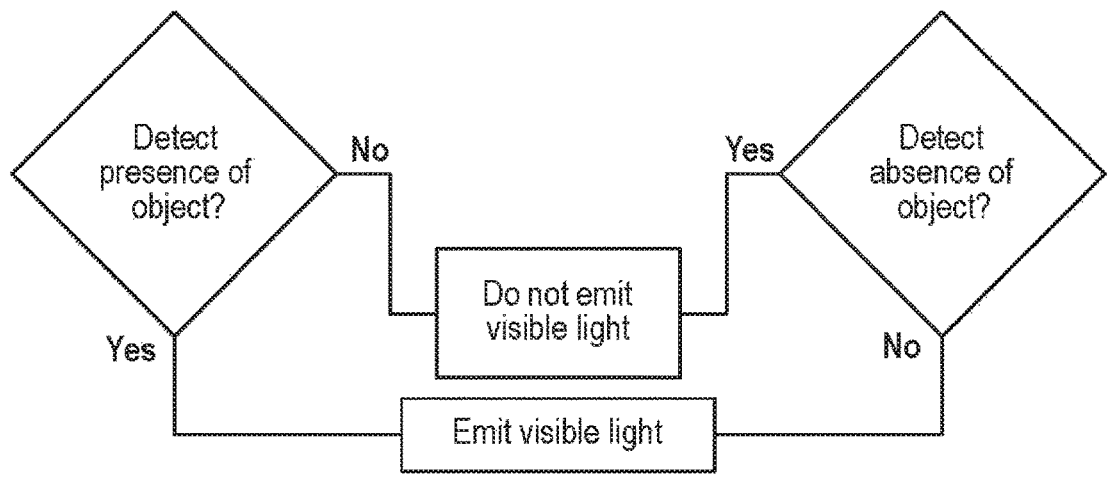
FIG. 4 illustrates a flow chart for using the radar system, according to embodiments of the present disclosure.

The radar system 10 can also include at least one light source 18 coupled to the housing 12. The at least one light source 18 can emit visible light 20 along the first direction X and the second direction Y. As illustrated in FIG. 4, the radar system 10 can be configured to emit the visible light 20 from the at least one light source 18 in response to the RF transmitter 14 detecting an object 24, via the RF light 16, as shown in FIG. 2. Stated differently, the radar system 10 can be arranged and configured to not emit the visible light 20 in response to the RF light 16 detecting the absence of the object 24. In this regard, when the radar system 10 emits visible light 20 this may indicate an unsafe condition whereby an object 24 is too close to the radar system 10 and/or other sensitive equipment.

Figure 6:
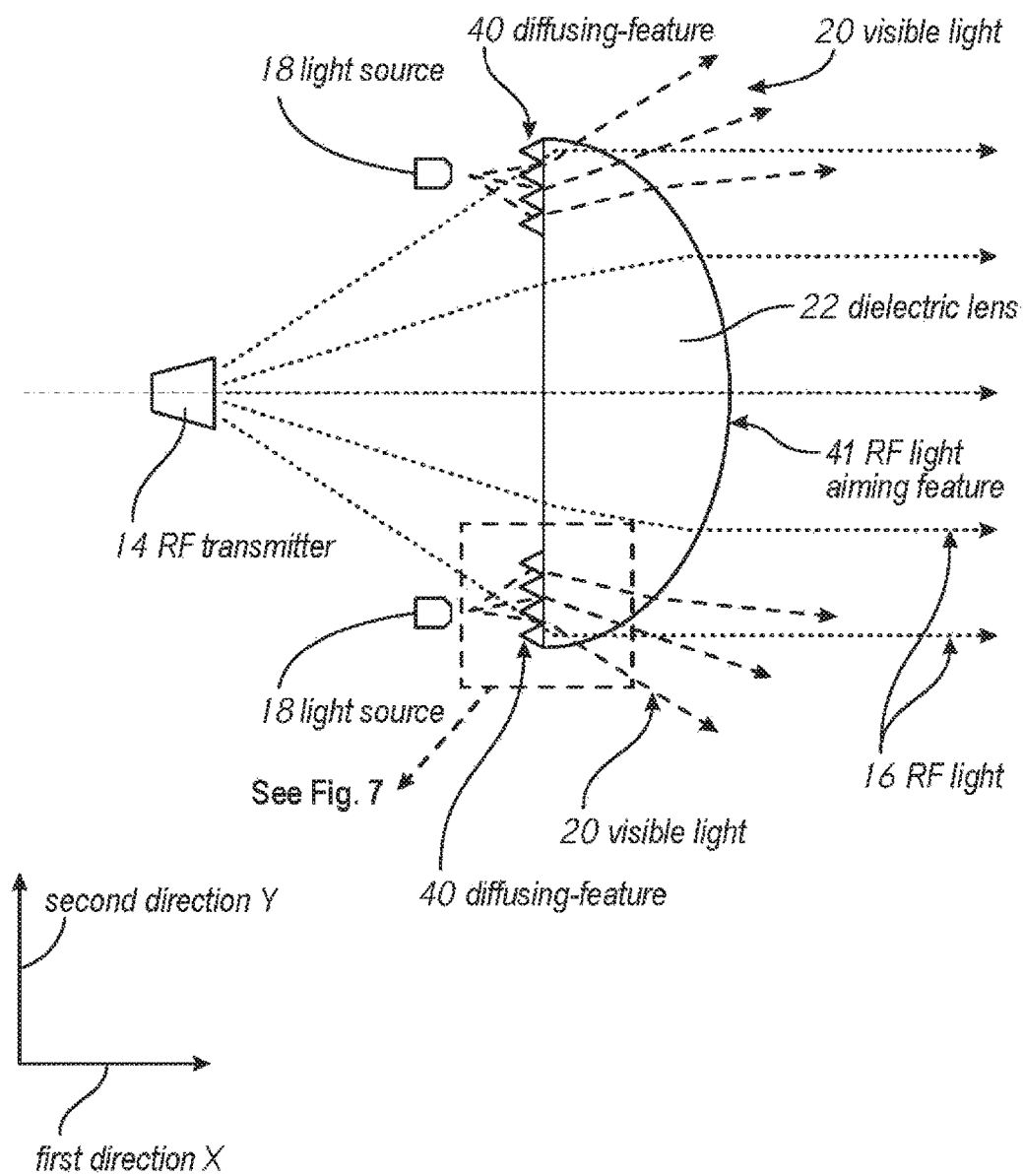
FIG. 6 illustrates a side view of another dielectric lens and an RF transmitter, according to embodiments of the present disclosure.

With specific reference to FIG. 6, the RF transmitter 14 can emit RF light 16 and the at least one light source 18 can emit visible light 20 along various paths and angles, such as the conical shapes in FIG. 6, which includes components of the RF light 16 and the visible light 20 traveling along the first direction X and the second direction Y. While the angle between the first direction X and the second direction Y is approximately 90-degrees in FIG. 6, generally, the RF light 16 and the visible light 20 can travel along any angle between the first direction X and the second direction Y including any angle greater than 0 degrees and less than 360 degrees. Furthermore, while the disclosure states that the RF light 16 and the visible light 20 travels along the first direction X and the second direction Y this should be interpreted to mean that the light does not have to include two beams with each traveling directly along the first direction X and the second direction Y. Rather, the RF light 16 and/or visible light 20 can each be a single beam traveling along a path defined by a slope. In this regard, saying that the light travels along the first direction X and the second direction Y can mean that the light travels along a slope having a rise and run along the second direction Y and the first direction X, respectively.

Alternatively, in some embodiments, the radar system 10 can be arranged and configured in an opposite manner whereby the radar system 10 does not emit visible light 20 from the at least one light source 18 in response to the RF light 16 detecting an object. Accordingly, the visible light 20 is emitted from the radar system 10 when the RF light 16 does not detect an object 24. For example, when the radar system 10 emits the visible light 20 this can indicate a safe condition when an object 24 is not present.

As shown in FIGS. 2 and 3, the radar system 10 can also include a dielectric lens 22 coupled to the housing 12. The dielectric lens 22 can allow both the RF light 16 and the visible light 20 to pass through the dielectric lens 22. However, the dielectric lens 22 can be further arranged and configured to collect the RF light 16 from the RF transmitter 14 and focus the RF light 16 along the first direction X and/or the second direction Y. Additionally, the dielectric lens 22 can be arranged and configured to collect the visible light 20 from the at least one light source 18 and thereby scatter the visible light 20 along the first direction X and the second direction Y. As such, while the dielectric lens 22 can allow both RF light 16 and visible light 20 to pass through the dielectric lens 22, the dielectric lens 22 can redirect, focus, and scatter the RF light 16 and the visible light 20 in very different ways.

Figure 5:
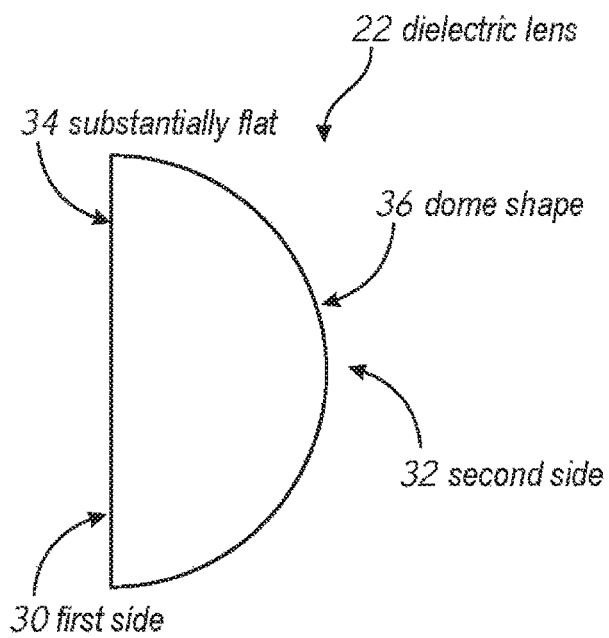
FIG. 5 illustrates a side view of a dielectric lens, according to embodiments of the present disclosure.

With reference to FIG. 5, the dielectric lens 22 can collect the RF light 16 and the visible light 20 along a first side 30 of the dielectric lens 22. The lens 22 can thereby focus the RF light 16 and scatter the visible light 20 from a second side 32 that is opposite the first side 30. In some embodiments, the first side 30 is substantially flat 34, and the second side 32 is a dome shape 36. However, it should be appreciated that the first side 30 and second side 32 can define any such shapes that accomplish the objectives as stated herein. For example, in some embodiments, the first side 30 defines a dome shape, while the second side 32 defines a substantially flat shape. In some embodiments, the first side 30 defines a dome shape, while the second side 32 also defines a dome shape. Even still, in some embodiments, the first side 30 defines a substantially flat shape, while the second side 32 also defines substantially flat shape. Furthermore, in some embodiments, the dielectric lens 22 can define a cylindrical shape. Specifically, the first side 30 and the second side 32 can define the cylindrical shape, whereby the first side 30 defines a first semi-circle and the second side 32 defines a second semi-circle.

FIG. 6 further illustrates how the dielectric lens 22 redirects the different types of light. As shown, the dielectric lens 22 collects RF light 16 traveling along the first direction X and the second direction Y, and then focuses (or redirects) the RF light 16 along the first direction X. As well, the dielectric lens 22 collects visible light 20 traveling along the first direction X and the second direction Y, and then scatters the visible light 20 along the first direction X and the second direction Y. In this manner, the dielectric lens 22 can receive visible light 20 traveling along a first path (i.e. traveling along a path along some slope of the first and second directions X, Y) and then redirect the visible light 20 along a second path that is different from the first path. In some embodiments, the second direction Y is within 5 degrees of parallel from the first direction X. However, in some embodiments, the second direction Y is perpendicular to the first direction X.

The radar system 10 can be configured in a variety of dimensional configurations to accommodate different size RF transmitters 14 and light sources 18. For example, in some embodiments, the at least one light source 18 is disposed closer to the dielectric lens 22 than the RF transmitter 14. However, in some embodiments, the at least one light source 18 can be disposed equidistant and/or further away from the dielectric lens 22 than the RF transmitter 14. In this manner, the radar system 10 can effectively utilize lower or higher powered light sources 18 and/or RF transmitters 14.

Figure 7:
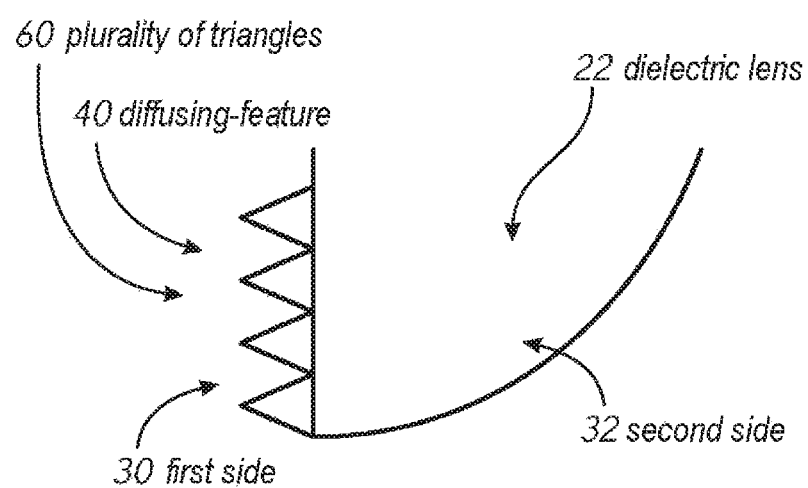
FIG. 7 illustrates a close-up view of the dashed rectangle from FIG. 6, according to embodiments of the present disclosure.

To redirect, focus, and/or scatter the different types of light, the dielectric lens 22 can include visible light diffusing-features 40 and RF light aiming features 41. As shown in FIGS. 6 and 7, the first side 30 of the dielectric lens 22 can include at least one light diffusing-feature 40 arranged and configured to collect the visible light 20 traveling along the first direction X and the second direction Y. The light diffusing-feature can then scatter the visible light 20 from the second side 32 along the first direction X and the second direction Y. In some embodiments, the visible light diffusing-features can define a plurality of triangles 60 or any combination of shapes, such as rectangles, and the like. The shapes can all be sized and shaped alike or they can each define unique sizes and shapes from one another.

Additionally, the second side 32 of the dielectric lens 22 can include a plurality of RF light aiming features 41 arranged and configured to collect the RF light 16 traveling along the first direction X and the second direction Y. The RF light aiming feature 41 can then focus the RF light 16 from the second side 32 along the first direction X. Unlike the visible light diffusing-feature 40, the RF light aiming feature 41 may not be uniquely sized and shaped features, and instead the RF light aiming function can be accomplished via material properties inherent in the construction material of the second side 32 of the dielectric lens 22. However, and like the visible light diffusing-feature 40, in some embodiments, the RF light aiming features 41 can be accomplished via a variety of shapes defining any size along the second side 32, such as triangles, rectangles, and the like.

Figure 8:
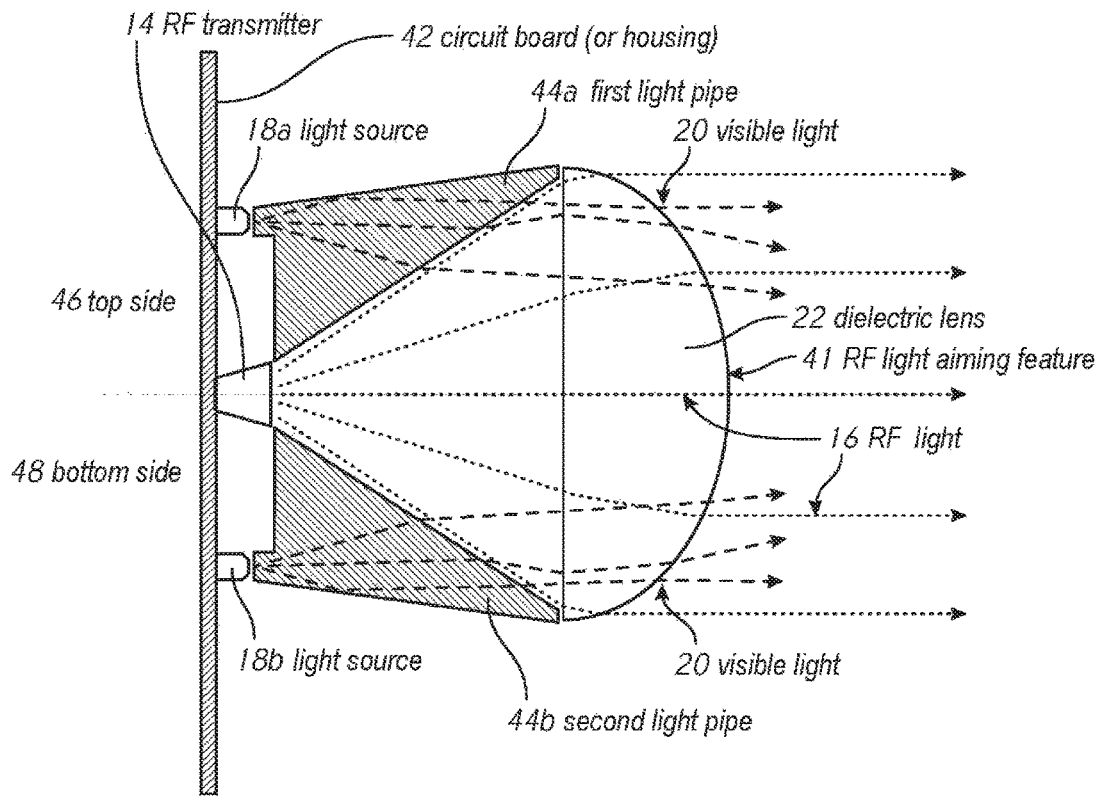
FIG. 8 illustrates a side view of yet another dielectric lens and an RF transmitter, according to embodiments of the present disclosure.
Figure 9A:
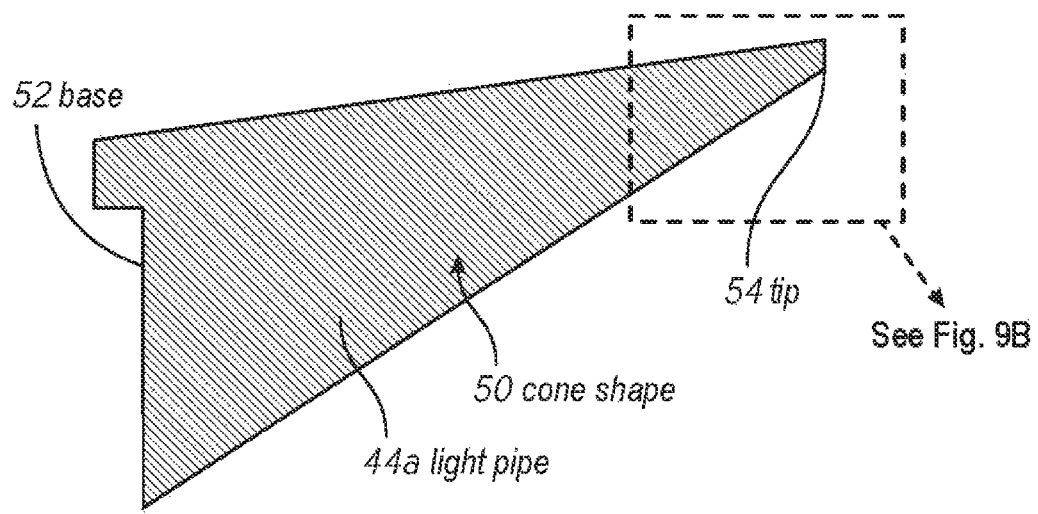
FIG. 9A illustrates a side view of a light pipe from the system illustrated in FIG. 8, according to embodiments of the present disclosure.
Figure 9B:
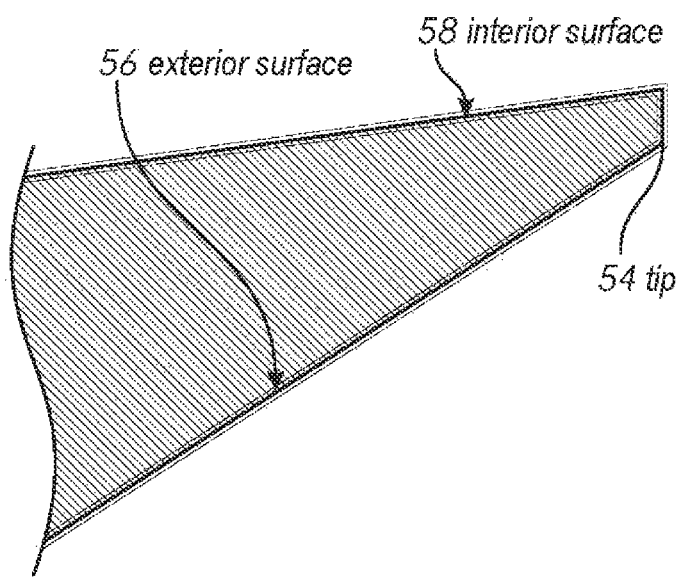
FIG. 9B illustrates a close-up view of the dashed rectangle from FIG. 9A, according to embodiments of the present disclosure.

The radar system 10 can also be implemented with other features to diffuse and/or redirect the visible light 20. As illustrated in FIGS. 8, 9*a*, and 9*b*, the radar system 10 can include a first light source 18*a* disposed along a top side 46 of the housing 42 and a second light source 18*b* disposed along a bottom side 48 of the housing 42. The radar system 10 can thereby include a first light pipe 44*a* disposed along the top side 46 of the housing 42 and a second light pipe 44*b* disposed along the bottom side 48 of the housing 42. The first and second light pipes 44*a*, 44*b* can define exterior surfaces 56 arranged and configured to reflect at least a portion of the RF light 16 and interior surfaces 58 arranged and configured to diffuse the visible light 20. It should be appreciated that the exterior surface 56 is the surface that faces the RF transmitter, while the interior surface 58 is the surface that faces the light source 18.

With reference to FIGS. 9*a* and 9*b*, the first and second light pipes 44*a*, 44*b* can each define a cone-shape 50 each having a base 52 and a tip 54 disposed opposite the base 52. In some embodiments, each respective base 52 of the first and second light pipes 44*a*, 44*b* are disposed closer to the RF transmitter 14, the first light source 18*a*, and the second light source 18*b* than each respective tip 54 of the first and second light pipes 44*a*, 44*b*. Accordingly, each respective tip 54 of the first and second light pipes 44*a*, 44*b* can be disposed closer to the dielectric lens 22 than each base of the first and second light pipes 44*a*, 44*b*.

Interpretation

For the purposes of this disclosure, the term "substantially" should be understood to mean for the most part or to a great or significant extent. Additionally, for the purposes of this disclosure, the term "dome" should be interpretted to include the following shapes (when viewed cross-sectionally as in FIG. 2, 3, 5, 6, or 8): a hyperbolic curve, a hemisphere, any type of bulge shape, and the like.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A radar system for detecting objects, comprising:
   a housing;
   an RF transmitter coupled to the housing, wherein the RF transmitter emits an RF signal defining waves between 0.3 GHz and 300 GHz along a first direction and a second direction that is not parallel to the first direction;
   at least one light source coupled to the housing, wherein the at least one light source emits visible light along the first direction and the second direction; and
   a dielectric lens coupled to the housing, wherein the dielectric lens collects the RF signal and focuses the RF signal, and wherein the dielectric lens collects visible light and scatters the visible light.

2. The system of claim 1, wherein the dielectric lens collects the RF signal traveling along the first direction and the second direction, and the dielectric lens focuses the RF signal along the first direction, and
   wherein the dielectric lens collects visible light traveling along the first direction and the second direction, and the dielectric lens scatters the visible light along the first direction and the second direction.

3. The system of claim 1, wherein the second direction is within 5 degrees of parallel from the first direction.

4. The system of claim 1, wherein the system emits the visible light in response to the RF signal detecting the presence of an object.

5. The system of claim 1, wherein the system does not emit the visible light in response to the RF signal detecting the absence of the object.

6. The system of claim 1, wherein the dielectric lens collects the RF signal and the visible light along a first side of the dielectric lens, and wherein the dielectric lens focuses the RF signal and scatters the visible light from a second side that is opposite the first side.

7. The system of claim 6, wherein the first side is substantially flat and the second side defines a dome shape.

8. The system of claim 7, wherein the first side of the dielectric lens comprises at least one visible light diffusing-feature arranged and configured to collect the visible light traveling along the first direction and the second direction, and scatter the visible light, from the second side, along the first direction and the second direction, and
   wherein the second side of the dielectric lens comprises a plurality of RF signal aiming features arranged and configured to collect the RF signal traveling along the first direction and the second direction, and focus the RF signal, from the second side, along the first direction.

9. The system of claim 6, wherein the first side and the second side define a cylindrical shape.

10. The system of claim 1, wherein the at least one light source is disposed closer to the dielectric lens than the RF transmitter.

11. The system of claim 1, wherein the at least one light source is disposed at least one of equidistant and further from the dielectric lens than the RF transmitter.

12. The system of claim 11, wherein the at least one light source comprises a first light source disposed along a top side of the housing and a second light source disposed along a bottom side of the housing, wherein the bottom side is opposite the top side, the system further comprising:
    a first light pipe disposed along the top side of the housing, wherein the first light pipe defines an exterior surface arranged and configured to reflect at least a portion of the RF signal and an interior surface arranged and configured to diffuse the visible light; and
    a second light pipe disposed along the bottom side of the housing, wherein the second light pipe defines an exterior surface arranged and configured to reflect at least a portion of the RF signal and an interior surface arranged and configured to diffuse the visible light.

13. The system of claim 12, wherein the first light pipe defines a first cone-shape having a first base and a first tip disposed opposite the first base, and the second light pipe defines a second cone-shape having a second base and a second tip disposed opposite the second base,
    wherein the first base and the second base are disposed closer to the RF transmitter, the first light source, and the second light source than the first tip and the second tip, and
    wherein the first tip and the second tip are disposed closer to the dielectric lens than the first base and the second base.

14. A dielectric lens, comprising:
    a dome-shaped lens having a first side and a second side opposite the first side, wherein the first side is substantially flat and the second side defines a dome-shape;
    at least one visible light diffusing-feature arranged and configured to collect visible light traveling towards the first side, and scatter the visible light from the second side; and
    a plurality of RF signal aiming features arranged and configured to collect an RF signal defining waves between 0.3 GHz and 300 GHz traveling towards the first side, and focus the RF signal from the second side.

15. The dielectric lens of claim 14, wherein the at least one visible light diffusing-feature is disposed along the first side of the dielectric lens, and the plurality of RF signal aiming features are disposed along the second side of the dielectric lens.

16. The dielectric lens of claim 15, wherein the at least one visible light diffusing-feature is arranged and configured to collect visible light traveling along a first direction and a second direction that is not parallel to the first direction, and scatter the visible light, from the second side, and wherein the plurality of RF signal aiming features are arranged and configured to collect the RF signal traveling along the first direction and the second direction, and focus the RF signal, from the second side, along the first direction.

17. The dielectric lens of claim 16, wherein the first side of the dome-shaped lens is arranged and configured to redirect the RF signal.

18. The dielectric lens of claim 17, wherein the at least one visible light diffusing-feature defines a plurality of triangles disposed adjacent one another.

19. The dielectric lens of claim 16, wherein the second direction is within 5 degrees of parallel from the first direction.

20. The dielectric lens of claim 16, further comprising:
- a first light pipe extending from a top side of the dome-shaped lens, wherein the first light pipe defines an exterior surface arranged and configured to reflect the RF signal and an interior surface arranged and configured to diffuse visible light; and
- a second light pipe extending from a bottom side of the dome-shaped lens, the bottom side being opposite the top side, wherein the second light pipe defines an exterior surface arranged and configured to reflect the RF signal and an interior surface arranged and configured to diffuse visible light.

* * * * *